United States Patent [19]

Mariotti et al.

[11] Patent Number: 4,490,515

[45] Date of Patent: Dec. 25, 1984

[54] HOT STRENGTH CYANOACRYLATE ADHESIVE COMPOSITION

[75] Inventors: Chris S. Mariotti; Ju-Chao Liu, both of Newington, Conn.

[73] Assignee: Loctite Corporation, Newington, Conn.

[21] Appl. No.: 473,971

[22] Filed: Mar. 7, 1983

Related U.S. Application Data

[63] Continuation of Ser. No. 246,560, Jun. 1, 1981, abandoned.

[51] Int. Cl.³ .................................................. C08F 220/34
[52] U.S. Cl. .................................... 526/298; 526/204; 526/270; 526/282
[58] Field of Search ................. 526/298, 204, 270, 282

[56] References Cited

U.S. PATENT DOCUMENTS

| | | | | |
|---|---|---|---|---|
| 3,354,128 | 11/1967 | Wicker | .................. | 526/298 |
| 3,692,752 | 9/1972 | Setsuda | .................. | 526/261 |
| 3,825,128 | 7/1974 | Cooper | .................. | 212/15 |
| 3,825,580 | 7/1974 | Kato et al. | .................. | 260/465.4 |
| 3,928,286 | 12/1975 | Akiyama et al. | .................. | 260/31.4 R |
| 3,988,229 | 10/1976 | Pacifici et al. | .................. | 526/323.1 |
| 4,085,164 | 4/1978 | Griffin et al. | .................. | 260/77.5 |
| 4,196,271 | 4/1980 | Yanada et al. | .................. | 526/298 |

FOREIGN PATENT DOCUMENTS 1546815 3/1976 United Kingdom .

*Primary Examiner*—Harry Wong, Jr.
*Attorney, Agent, or Firm*—Walter J. Steinkraus; Eugene F. Miller

[57] ABSTRACT

An adhesive composition having improved thermal properties, especially hot strength, comprising (a) at least one polymerizable cyanoacrylate monomer, (b) about 0.1 to about 10% by weight of at least one polymerizable acrylate ester and (c) about 0.1 to about 20% by weight of an additive selected from the group consisting of the following compounds:

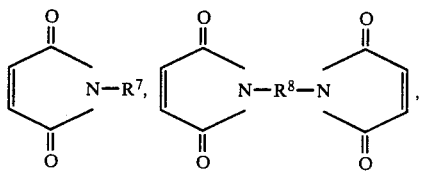

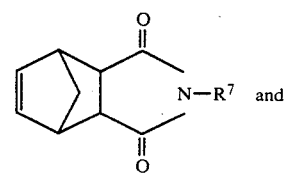

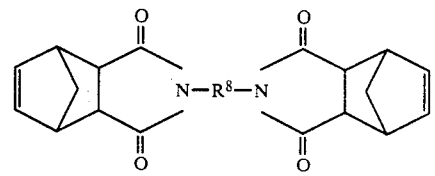

wherein $R^7$ and $R^8$ are selected from the group consisting of alkyl, cycloalkyl, aralky and alkaryl. The compositions disclosed herein have excellent hot strength properties for long periods at 250° F. or more.

13 Claims, 2 Drawing Figures

COMPOSITION "A"
CHART OF
THERMOGRAM

HOT STRENGTH CYANOACRYLATE ADHESIVE COMPOSITION

This is a continuation of application Ser. No. 246,560, filed June 1, 1981 and now abandoned.

BACKGROUND OF THE INVENTION

1. Field of the Invention

This invention relates to certain liquid adhesive and sealant compositions which, upon cure, have improved structural strength properties at elevated temperatures and improved resistance to thermal degradation.

2. Prior Art

Adhesive and sealant compositions based on cyanoacrylate monomers are known in the art. Typical examples of patents relating to cyanoacrylate adhesives are U.S. Pat. Nos. 2,784,215 to Joyner, 2,794,788 to Coover et al., and British Pat. No. 1,196,069 to O'Sullivan. Cyanoacrylate adhesive compositions are extremely sensitive, and great care must be exercised in their formulation. Cure (polymerization) is generally considered to be initiated by an anionic mechanism, with water being a sufficiently strong base to initiate the cure under most circumstances. The adhesives remain shelf-stable items of commerce as long as they are suitably packaged, but when placed on a substrate to be bonded and exposed to atmospheric and surface moisture, cure generally is instituted in a relatively short period of time, generally less than one (1) minute and on many surfaces, within a matter of seconds. This exceptional cure speed offers numerous advantages, particularly to those who use adhesive bonding in production line applications. However, a major shortcoming which has heretofore limited the areas of applicability of cyanoacrylate adhesives has been the relatively low thermal resistance of the cured bonds. Bonded assemblies frequently are exposed to continuous operating temperatures substantially above normal room temperature, and adhesive assemblies must retain reasonable strength for substantial periods of time at these elevated temperatures to retain their usefulness.

In addition to strength retention by the adhesive at elevated temperatures (i.e., hot strength), the adhesive bonds must not be unduly affected by continuous or repeated exposure to elevated temperatures (resistance to heat degredation). In the prior art it has not been possible to prepare a cyanoacrylate adhesive composition which produced substantial cross-linking on cure, even when ostensively di-functional cyanoacrylate monomers were used. Further, because of the extreme reactivity of the cyanoacrylate monomer, there have been substantial limitations upon addition of other ingredients, such as cross-linking agents or co-monomers, in order to improve the above-described thermal properties.

In U.S. Pat. No. 3,832,334, the problem of thermal resistance was solved by the addition of maleic anhydrides and their substitution products. Additionally, it has been known in the prior art to include cross-linking agents such as allyl-2-cyanoacrylate or polymerizable acrylate esters to improve thermal properties. However, none of the prior art has shown the improved thermal properties at 250° F. that the instant invention is able to demonstrate. Thus, the need for such a useful adhesive is evident and would prove useful in many applications.

SUMMARY OF THE INVENTION

There is provided an adhesive and sealant composition, which is normally liquid in the uncured state, and upon cure exhibits a significantly improved hot strength at elevated temperatures and improved resistance to thermal degradation. This composition comprises (a) at least one polymerizable cyanoacrylate, (b) about 0.1% to about 10% by weight of the composition of at least one difunctional or monofunctional polymerizable acrylate ester, (c) about 0.1% to about 20% by weight of the composition of an additive selected from the group consisting of the following compounds:

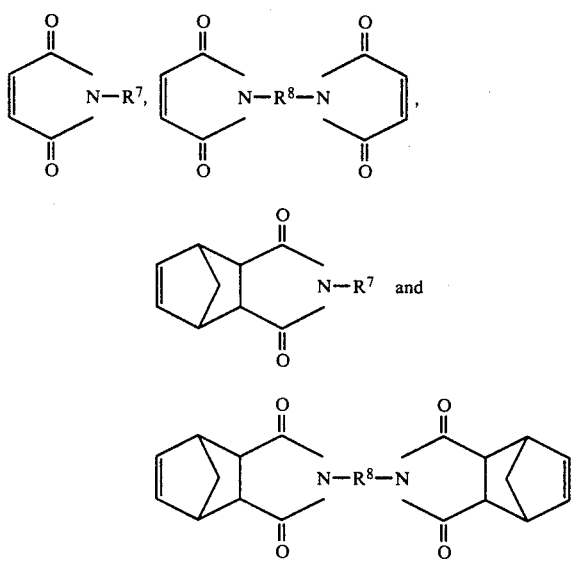

wherein $R^7$ and $R^8$ are selected from the group consisting of alkyl, cycloalkyl, aralkyl and alkaryl, (d) an anionic polymerization inhibitor; and (e) optionally a free-radical polymerization inhibitor.

The instant invention solves the problems of the prior art adhesives, particularly their inability to retain their structural integrity at elevated temperatures (hot strength), as well as their low resistance to thermal degradation through heat aging. The compositions disclosed herein are useful in a variety of surfaces, particularly steel, aluminum, phenolics, epoxies, and thermoplastic materials. The shelf-life stability and cure speed are excellent as well.

DETAILED DESCRIPTION OF THE INVENTION AND PREFERRED EMBODIMENTS

Figure 1:
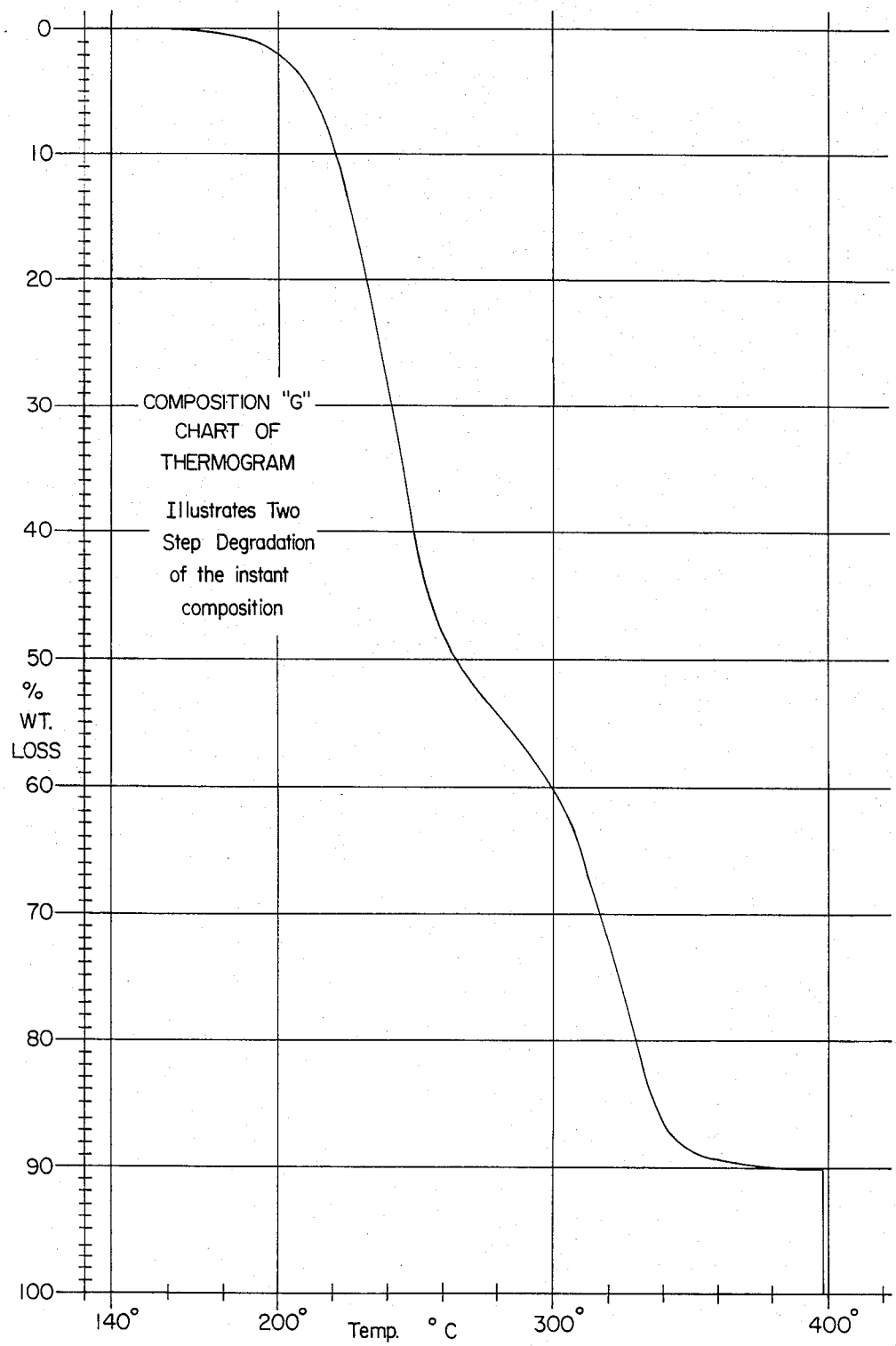

The cyanoacrylate monomers useful in this invention are represented by the general formula:

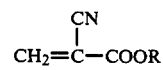

wherein R is $C_{1-16}$ alkyl, cycloalkyl, alkenyl, cycloalkenyl, phenyl or heterocyclic radical. The preferred monomer which conforms to the general formula is ethyl cyanoacrylate, but a mixture of the above can be useful.

The polymerizable acrylate ester monomers useful in this invention may be mono- or polyfunctional, or a mixture of both, and conform to the general formulae:

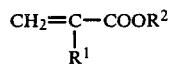

II wherein $R^1$ is H, $CH_3$ or lower alkyl, and $R^2$ is alkenyl; or

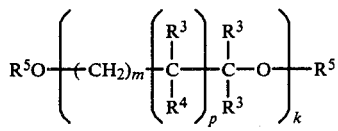

III wherein $R^3$ is H, $C_{1-4}$ alkyl or hydroxyalkyl or $R^5OCH_2$—; $R^4$ is H, OH or $R^5O$; $R^5$ is $CH_2$=$CR^6C$=O; $R^6$ is H, halogen or $C_{1-4}$ alkyl; m is an integer, preferably 1 to 8; k is an integer, preferably 1 to 20; and p is 0 or 1.

There must be at least one acrylate ester monomer present in the instant composition, generally in the amount of about 0.1% to about 10% by weight of the total composition. The preferred amount is about 1 to about 5%, most preferably about 1% by weight.

The polymerizable polyacrylate esters utilized in accordance with the invention and corresponding to the above general formula II are exemplified by, but not restricted to, the following materials: diethylene glycol dimethacrylate, triethylene glycol dimethacrylate, tetraethylene glycol dimethacrylate, dipropylene glycol dimethacrylate, di-(pentamethylene glycol) dimethacrylate, tetraethylene diglycerol diacrylate, diglycerol tetramethacrylate, tetramethylene dimethacrylate, ethylene dimethacrylate, neopentyl glycol diacrylate and trimethyol propane triacrylate. Of these, the preferred monomers are triethylene glycol dimethacrylate and polyethylene glycol dimethacrylate.

Another ingredient essential to the instant invention is an additive selected from the group consisting of any of the following structures:

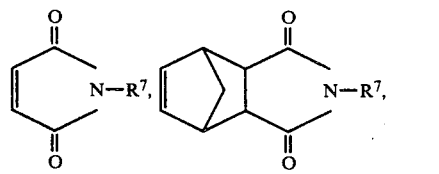

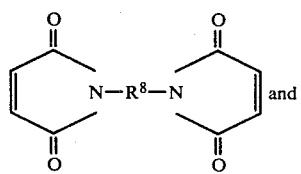

and

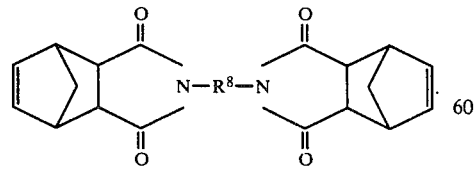

The nature of $R^7$ and $R^8$ is not critical for purposes of this invention and may be any organic radical which does not contain any group which will adversely affect the composition for purposes disclosed herein. Most commonly, $R^7$ and $R^8$ are selected from the group consisting of alkyl, cycloalkyl, aralkyl, alkaryl, aryl, aryloxy and alkoxy, any of which may be exceptionally large radicals; e.g., containing up to about 200 carbon atoms or more; preferably they will contain from 6 to about 100 carbon atoms, most preferably, 6 to about 50 carbon atoms.

It has been found that resistance to thermal oxidative degradation is improved if $R^7$ or $R^8$ is aromatic; however, this is not required for the general improvement of this invention to be realized. It will, of course, be understood that both $R^7$ and $R^8$ can consist of relatively complicated moieties, provided only that they do not contain functionality which interferes with the performance of the additive for its intended purposes. The useful concentrations range for this additive is about 0.1 to about 20%, preferably about 1 to about 5% by weight of the total composition and more preferably about 2%.

Without wishing to be bound by any one theory, it is believed that the improved hot strength properties obtained from the instant composition are a result of the unique combination of the above maleimides with the polymerizable acrylate esters, both of which are vital constituents in the cyanoacrylate adhesive composition. Theoretically, the maleimide additive reacts with the cyanoacrylate monomer during polymerization. The maleimide ring opens to participate in the reaction and grafts to the cyanoacrylate chain during its polymerization.

Without intending to be bound to any particular chemical theory, it is believed that as the cyanoacrylate cures, the maleimide is incorporated into the cyanoacrylate chain. Subsequent elevated temperatures are believed to induce a second stage of polymerization between the grafted maleimides, which have unsaturated cites, and the acrylic ester monomer. Cross-linkages are thus formed. The superior ability to maintain structural properties, such as tensile strength, at temperatures of 250° F. or more for long periods of time, as well as to resist the general effects of thermal aging, is attributed to this unique interaction.

Generally, the amount of the maleimide additive to be used is about 0.1 to about 20% by weight of the composition, but the preferred amount is about 1 to about 5%, the most prefered amount being about 2%. Amounts of about 2% or less readily dissolve at room temperature into the cyanoacrylate and acrylic ester monomer. Above this amount, the additive may remain in suspension in the liquid composition, still serving its function and producing the desired properties, however.

Among the maleimide additives preferred is the following structure:

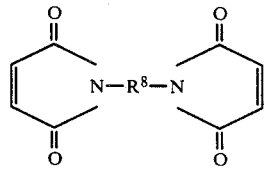

where $R^8$ is a phenyl group. This compound is manufactured by E. I. DuPont de Nemours & Co., under the trade name HVA.

It is important to maintain proper stability of the composition without losing the advantage of fast cure.

The stability can be controlled by the use of known inhibitors of anionic polymerization.

Standard acidic gases, such as sulfur dioxide, sulfur trioxide and nitric oxide, can be incorporated as conventional inhibitors of anionic polymerization. However, it is preferred that a combination of sulfur dioxide and an acid selected from the group of sulfonic acids, phorphorus acids, phosphonic acids, and carboxylic acids, with a PKa range of about −12 (negative twelve) to about 7 (seven) be used. This inhibiting system is disclosed in a co-pending application, Ser. No. 06/160,512, filed June 18, 1980, now abandoned. The most preferred components of the combination are sulfur dioxide with methane sulfonic acid, both present in the range of about 0.005 to about 10% by weight of the composition, but most preferably in the range of about 0.005 to about 0.1%. The preferred proportion of $SO_2$ to methane sulfonic acid is 20:50. Hydroxypropane sulfonic acid may also be used.

It is optional, but recommended, that an inhibitor of free-radical polymerization, selected from the group consisting of hydroquinones, benzoquinones, naphthoquinones, phenanthraquinones, anthraquinones, and a substituted compound of any of the foregoing, be incorporated into the adhesive as well. Hydroquinone is the most preferred.

Generally, the amount of such inhibitors is about 0.17 to about 10% by weight of the composition, 0.17 to 5% being preferred, and 0.95% being most preferred.

by weight based on the amount of ethyl cyanoacrylate, which comprises the rest of the adhesive composition.

TABLE I

| Additives % by weight | Compositions | | | | | | |
|---|---|---|---|---|---|---|---|
| | (control) A | (control) *B | C | *D | E | F | G |
| | | | | (controls) | | | |
| HVA | — | — | 2% | 2% | — | 4% | 2% |
| allyl methacrylate | — | — | 1% | 1% | 2% | — | 5% |
| inhibitors | 0.2% | 0.2% | 0.2% | 0.2% | 0.2% | 0.2% | 0.2% |

*Compositions B & D had approximately 5% thickening agents to increase their Brookfield viscosity to 200 cps at 25° C., using a No. 2 spindle.

EXAMPLE 1

Hot strengths of control compositions A and B from Table I were measured at 250° F. Grit-blasted and solvent washed steel laps were used to prepare lap shear samples with these compositions and the samples were then aged and tested at 250° F. The lap shear samples were allowed to cure for 24 hours at room temperature before heat aging.

After 1 hour, the lap shear tensile strength of composition A was 1300 psi. After 25 hours, the strength dropped to 700 psi, and after 48 hours, the strength was 650 psi.

Composition B was similarly tested and the results are tabulated in the table below:

TABLE II

| | HOT STRENGTH AFTER AGING AT 250° F. | | | | | | | | | |
|---|---|---|---|---|---|---|---|---|---|---|
| | Tested at 250° F. - psi/% strength retention | | | | | | | | | |
| Composition | room temp. control | 1 HR | 24 HRS | 48 HRS | 72 HRS | 96 HRS | 1 WK | 2 WKS | 3 WKS | 4 WKS |
| B | 3250/ 100% | 1120/ 34% | 690/ 21% | 650/ 20% | 670/ 21% | 400 12% | 740 23% | 700/ 22% | 500/ 17% | 520/ 16% |

Other agents such as thickeners, plasticizers, diluents, etc. are also known in the art and may advantageously be incorporated where functionally desirable, provided only that they do not interfere with the functioning of the vital additives for their intended purposes. The instant compositions exhibit good shelf-life stability, e.g., they normally remain liquid at room temperature in the uncured state. This, of course, can be determined by simple experimentation.

EXAMPLES

The following examples are given to demonstrate the compositions within the scope of the invention disclosed herein. These examples are not intended to be limitations on the scope of the invention.

Below is a table of the ingredients in each of the compositions used in the examples. All percentages are As noted from the data above, there is a significant decrease in the hot strength properties as measured by lap shear tensile at 250° F. beginning with the first hours of aging and continuously declining until there is little structural integrity at the bondline.

These compositions are ones typical of the prior art and clearly demonstrate the degradation of tensile strength at elevated temperature. This example is for the purpose of comparison with the compositions of the instant invention (see Examples 2 and 3).

EXAMPLE 2

Compositions C and D from Table I were used to prepare grit-blasted steel lap shears, which were subsequently aged and tested at 250° F. The results are tabulated in the table below:

TABLE III

| | HOT STRENGTH AFTER AGING AT 250° F. | | | | | | | | | |
|---|---|---|---|---|---|---|---|---|---|---|
| | PSI/% Strength Retention as Compared With Control | | | | | | | | | |
| Composition | Room Temp. Control | 1 HR | 24 HRS | 48 HRS | 76 HRS | 96 HRS | 1 WK | 2 WKS | 3 WKS | 4 WKS |
| C | 2880/ 100% | 1150/ 40% | 1350/ 47% | 1580/ 55% | 1520/ 53% | 1440/ 50% | 1600/ 56% | 1320/ 46% | 1530/ 53% | 1400/ 49% |
| D | 3110/ 100% | 1450/ 47% | 1380/ 44% | 1620/ 52% | 1870/ 60% | 1700/ 55% | 1470/ 47% | 1560/ 50% | 1590/ 51% | 1520/ 49% |

The above table indicates that the formulations of the instant invention have excellent retention of tensile hot strength properties. The improvement is apparent from a comparison of the hot strengths of prior art adhesives (Example 1) and those of the instant invention.

EXAMPLE 3

Lap shear specimens were prepared as in the previous examples using compositions E and F and C.

TABLE IV

HOT STRENGTH AFTER AGING AT 250° F.
(PSI)
LAP SHEARS TESTED AT 250° F.

| Composition | 1 HR | 4 HRS | 1 DAY | 6 DAYS |
| --- | --- | --- | --- | --- |
| E | 720 | 540 | 890 | 1050 |
| F | 950 | 920 | 1200 | 1140 |
| C | 895 | 960 | 1343 | 1610 |

As indicated in Table I, composition E is similar to the control composition A, except that E has allyl methacrylate as an additional ingredient. Composition F is also similar to the control composition A, except it contains the additional ingredient HVA. Composition C is an embodiment of the instant invention.

The results of the above Table IV indicate that the use of HVA or an acrylic ester additive in the adhesive composition by themselves produces very similar hot strength results. The composition of the instant invention demonstrates an improved hot strength, particularly after 6 days at elevated temperatures.

EXAMPLE 4

This example demonstrates the improved heat resistance properties of the instant composition. Steel lap shears were prepared with compositions A, F, and G in the same manner as before, and heat aged at 250° F. for up to five (5) days. The lap shears were then allowed to cool to room temperature and pulled. The results are shown below:

TABLE V

HEAT RESISTANCE (PSI)

| Composition | Room Temp. | Days exposure at 250° F. | | | | |
| --- | --- | --- | --- | --- | --- | --- |
| | | 1 | 2 | 3 | 4 | 5 |
| A (control) | 1600 | 613 | 550 | — | — | — |
| F | 2025 | — | — | 1017 | 917 | 900 |
| G | | 1642 | 1775 | 1800 | 1913 | 1592 |

As evidenced by the above table, composition G of the instant invention is superior in its heat resistance capability than those compositions of the prior art. Composition A was a typical prior art cyanoacrylate adhesive composition, and composition F and HVA in its formulation (see Table I). This example clearly illustrates that the instant compositions yield improved heat resistance characteristics over the prior art compositions.

EXAMPLE 5

This last example shows results from a thermal stability test (thermogram). This test involves heating a sample of the cured composition and measuring its weight loss. The weight loss is proportional to degradation of the polymer. The analysis was performed using a Perkin Emer TGS using the following conditions:

| | |
| --- | --- |
| Temperature range | 40° C.–400° C. |
| Heating range | 20° C./min. |
| Sample size | approx. 9 mg. |
| Purge gas | air at 40 cc/min. flow |
| Chart speed | 10 mm/min. |

Figure 2:
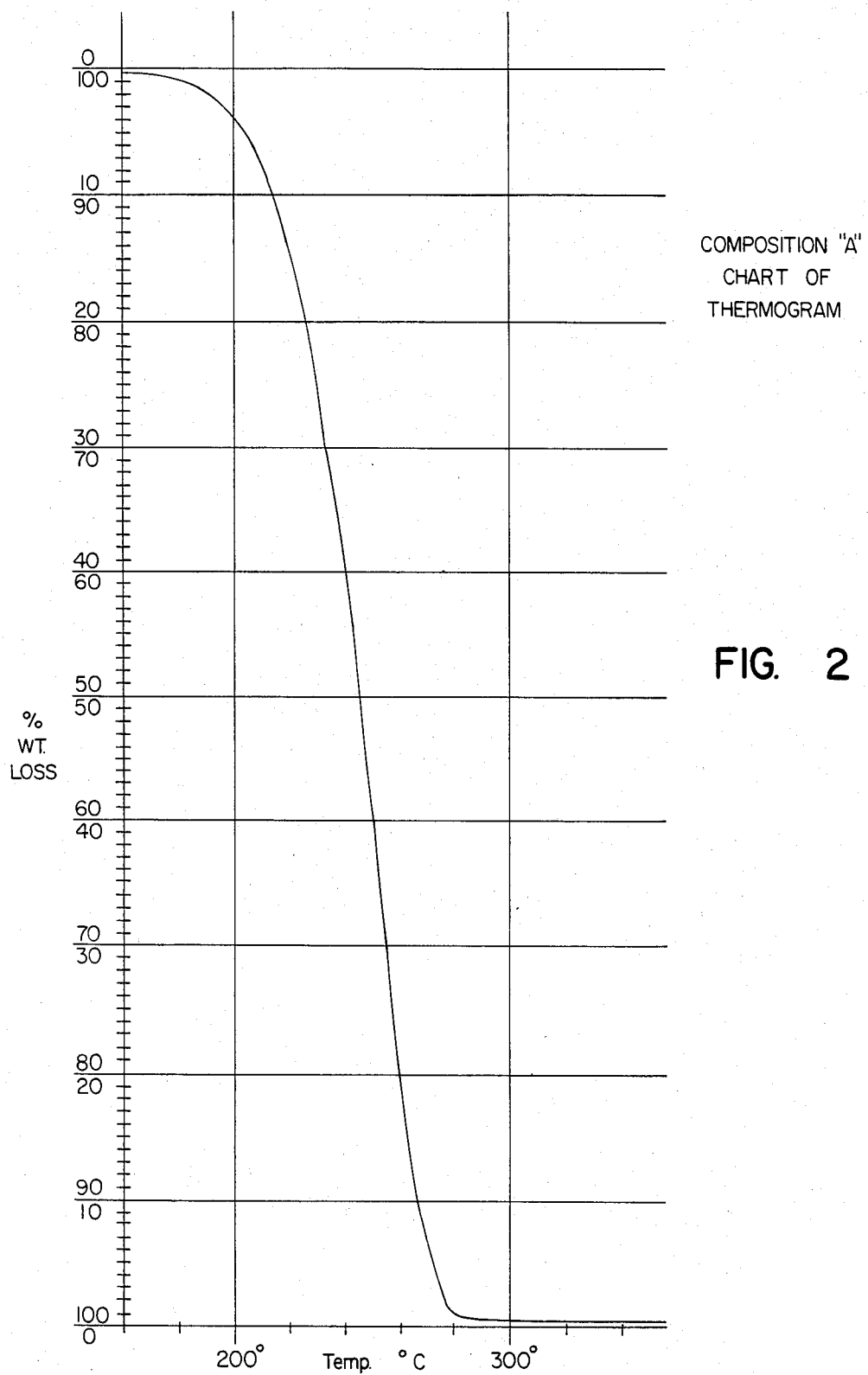

The results in the chart below indicate composition G of the instant invention retains nearly 50% of its weight at 280° C. and 40% of its weight at 300° C. It is apparent from the table below and FIGS. 1 and 2 that the compositions of this invention have two steps of decomposition, one which starts at 160° C. and represents 48% of the total sample, and another which starts at 280° C. and represents 42% of the sample weight. Contrast this with one step decomposition of the prior art. The prior art composition (control A) shows total degradation, 98.8% weight loss at 260° C.

TABLE VI

% Weight Lost at T° C.

| Comp. | 120 | 140 | 160 | 180 | 200 | 220 | 240 | 260 | 280 | 300 | 320 | 360 | 380 | 400 |
| --- | --- | --- | --- | --- | --- | --- | --- | --- | --- | --- | --- | --- | --- | --- |
| G | 0 | 0 | 0.2 | 0.5 | 1.7 | 7.8 | 25. | 46.8 | 53.8 | 59.8 | 72 | 86 | 89 | 90.2 |
| A | 0 | 0.2 | 0.3 | 0.8 | 2.2 | 13.0 | 78 | 98.8 | 99.3 | | | | | |

What is claimed is:

1. A room temperature curing adhesive composition having improved thermal properties comprising:
   (a) at least one polymerizable cyanoacrylate monomer of the general formula

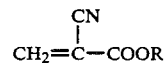

wherein R is $C_{1-16}$ alkyl, cycloalkyl, alkenyl, cycloalkenyl, phenyl or heterocyclic radical;
   (b) about 0.1 to about 20% by weight of the total composition of at least one polymerizable acrylate ester monomer of the general formula:

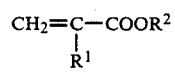

wherein $R^1$ is H, $CH_3$ or lower alkyl and $R^2$ is alkenyl, or

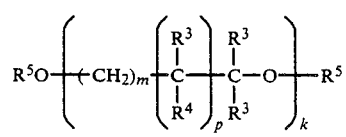

wherein $R^3$ is H, $C_{1-4}$ alkyl or hydroxyalkyl or $R^5OCH_2-$; $R^4$ is H, OH or $R^5O-$; $R^5$ is $CH_2=CR^6C=O$; $R^6$ is H, halogen of $C_{1-4}$ alkyl; m is an integer from 1 to 8, k is an integer from 1 to 20; and p is 0 or 1;
   (c) about 0.1 to about 20% by weight of the total composition of an additive selected from the group consisting of

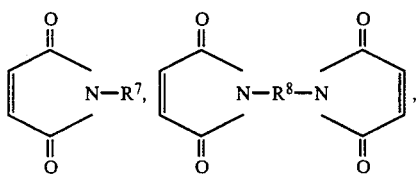

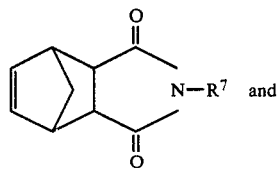

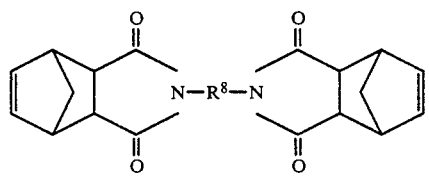

wherein $R^7$ and $R^8$ are selected from the group consisting of alkyl, cycloalkyl, aryalkyl, alkaryl, aryl, aryloxy and alkoxy; and (d) an anionic polymerization inhibitor present in the amounts of about 0.1% to about 10% by weight of the total composition.

2. The adhesive composition of claim 1, wherein the polymerizable cyanoacrylate monomer is ethyl cyanoacrylate.

3. The adhesive composition of claim 1, wherein the polymerizable acrylate ester monomer is allyl methacrylate, present in the amount of about 1% to about 5% by weight of the total composition.

4. The adhesive composition of claim 1, wherein the additive (c) is represented by the formula:

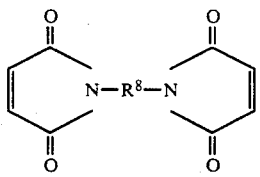

wherein $R^8$ is phenyl.

5. The composition of claim 4, wherein the additive (c) is present in the amount of about 2% by weight of the total composition.

6. A composition as in claim 1 further comprising a free-radical polymerization inhibitor present in amounts of between about 0.1% to about 10% by weight of the total composition.

7. The adhesive composition of claim 6, wherein the free-radical polymerization inhibitor is selected from the group consisting of hydroquinones, benzoquinones, naphthoquinones, phenanthraquinones, anthraquinones, and a substituted compound of any of the foregoing.

8. The adhesive of claim 1, wherein the ionic polymerization inhibitor is a combination of sulfur dioxide and an acid having a pKa of between −12 and 7.

9. The adhesive composition of claim 8, wherein the acid is methane sulfonic acid in the range of 0.005% to 10% by weight of the composition.

10. The adhesive composition of claim 9, wherein the sulfur dioxide and methane sulfonic acid are present in the ratio of 20:50.

11. The adhesive composition of claim 1, wherein the polymerizable acrylate ester monomer component (b) is selected from the group consisting of allyl methacrylate, tetraethylene glycol dimethacrylate, triethylene glycol dimethacrylate, polyethylene glycol dimethacrylate and mixtures thereof.

12. The adhesive composition of claim 1, wherein the composition contains a sulfimide or a tertiary amine, present in the amount of about 0.1 to about 10% by weight of the composition, as an accelerator of free-radical polymerization.

13. An adhesive composition as in claim 1, wherein component (a) is ethyl cyanoacrylate, component (b) is allyl methacrylate, and component (c) is

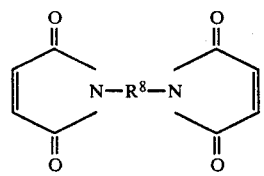

wherein $R^8$ is phenyl.

* * * * *